United States Patent [19]

Romanelli et al.

[11] Patent Number: 4,899,543
[45] Date of Patent: Feb. 13, 1990

[54] PRE-TENSIONED SHAPE MEMORY ACTUATOR

[75] Inventors: Marcello J. Romanelli, Dix Hills; Paul J. Otterstedt, Farmingdale, both of N.Y.

[73] Assignee: Grumman Aerospace Corporation, Bethpage, N.Y.

[21] Appl. No.: 330,385

[22] Filed: Mar. 29, 1989

[51] Int. Cl.⁴ ............................................. F03G 7/06
[52] U.S. Cl. ...................................................... 60/527
[58] Field of Search ......................... 60/527, 528, 529

[56] References Cited

U.S. PATENT DOCUMENTS

| | | |
|---|---|---|
| 2,362,424 | 11/1944 | Walsh . |
| 2,487,268 | 11/1949 | Oleson . |
| 2,692,406 | 10/1954 | Rhodes et al. . |
| 2,901,012 | 8/1959 | Crispin . |
| 3,110,553 | 11/1963 | Kniffin, Jr. . |
| 3,318,994 | 5/1967 | Perrone et al. . |
| 3,403,238 | 9/1968 | Buehler et al. . |
| 3,516,082 | 6/1970 | Cooper . |
| 3,613,732 | 10/1971 | Willson . |
| 3,625,002 | 12/1971 | Davis . |
| 3,725,835 | 4/1973 | Hopkins et al. . |
| 3,783,429 | 1/1974 | Otte . |
| 3,940,935 | 3/1976 | Richardson et al. . |
| 4,193,899 | 3/1980 | Brenner et al. . |
| 4,281,841 | 8/1981 | Kim et al. . |
| 4,329,315 | 5/1982 | Brower et al. . |
| 4,490,976 | 1/1985 | Johnson ................................ 60/527 |

OTHER PUBLICATIONS

Perkins, J. et al., "Stress-Induced Martensitic Transformation Cycling and Two-Way Shape Memory Training in Cu-Zn-Al Alloys," Metallurgical Transactions A, vol. 15A, Feb. 1984, pp. 313-321.

*Primary Examiner*—Allen M. Ostrager
*Attorney, Agent, or Firm*—Pollock, VandeSande & Priddy

[57] ABSTRACT

A pre-tensioned shape memory actuator for providing remote actuation at relatively high loads. The actuator utilizes a two-way shape memory alloy which is pre-tensioned to a pre-tensioned position, then partially compressed to a position intermediate its original position and the pre-tensioned position so as to allow the actuator unit to then fore-shorten back to the original position when heated, and to expand back to the intermediate position when again allowed to cool. The alloy is a part of a clamping device which applies compressive force to a work object at the intermediate position under normal temperatures and releases the compressive force when heated. Upon cooling, the cycle is completed as the memory alloy reverts to the intermediate position and once again applies the compressive force to the work object.

16 Claims, 4 Drawing Sheets

PRE-TENSIONED SHAPE MEMORY ACTUATOR

BACKGROUND OF THE INVENTION

1. Field of the Invention

Metal products developed from alloys which exhibit mechanical recall, are commonly referred to as Shape Memory Effect (SME). SME alloys are programmed to remember and return to a specific shape after considerable deformation.

An object made of SME alloy in its low temperature crystalline structure is deformed into a new shape. It will retain that shape when the stress of programming is removed. But when heated to the crystal transformation temperature corresponding to the alloy's high temperature structure, the object will revert to its original form. In SME alloys, strains of as much as eight percent are completely recovered. This is to be compared to similar forms of ordinary metal where much lower strains result in a permanent set.

There are two different states for shape memory alloys, both determined by temperature. The high temperature state is typically called beta and the low temperature state is called martensite. The temperature at which martensite forms and disappears is varied from below $-100°$ C. to over $+200°$ C. by varying the compostion of the SME alloy.

Based on this phenomenon, devices remember a variety of shapes and forms and will switch back and forth from one to the other in response to changes in their environment.

SME alloys are used in one-way devices. One-way forms begin as a basic shape such as a wire, rod, sheet, or tube. The metal is formed and clamped into a shape which it will later be called upon to remember. This form is heated and then cooled to fix or imprint the memory into the metal.

One-way memory is used to produce permanent joints or connections. In these cases, an alloy device is fixed onto the parts to be connected. The heat induces the clamp to remember its original form and resume that position, in this case a highly reliable, permanent joint. Once the one-way process is set in motion, the change in form is permanent. The automatic joint saves the user hours of assembly time, is used in applications where conventional connectors would not fit, cuts labor costs, and improves production efficiency.

Actuators of this type are used to produce inexpensive, high-integrity couplings for main frame computers and other data storage, communication and transmission systems where tamperproof, semi-permanent, fully aligned terminations are essential.

In an application for mono-mode fiber connectors, an alignment tube consists of an alloy bushing with less than the nominal diameter of the ferrule which holds the fiber optic strand. This bushing, deformed by stainless steel tubing, expands radially when heated beyond its transformation temperature. When this temperature is readed, the bore expands to allow easy insertion of the ferrules. On cooling, the stainless steeel tubing firmly clamps the ferrule in position, with any diameter mismatch taken up by elastic deformation of the alloy bushing.

The creation of two-way devices begins as an identical process to that of one-way devices. In this case, the alloy returns to a memorized shape on heating and cooling, not just on heating, as is the case with one-way memory.

This two-way memory effect does not occur in the material instantaneously. The metal must be trained. That is, it must go through this heating/cooling cycle several times with the same application of force so the alloy can memorize the process.

The process begins with the alloy in a basic shape, such as a wire, rod, sheet, or tube. The metal is formed and clamped into the shape it will later be called upon to remember and then heated to impress the shape into the metal's memory.

After the part has cooled to below its specific transformation temperature range, it is formed into yet another shape. When the part is again heated above its transformation temperature, it remembers its initial shape and returns to it. The process is repeated through several alternating cycles of heating and cooling until two-way memory is implanted. As the alloy reverts to its original shape, it exerts considerble force and may be used to do mechanical work.

SME alloys store large amounts of energy and then, through a solid-state reaction when heated, deliver this energy in a manner which produces sufficient force and motion to power, drive or control a number of devices. For example, an SME helical coil opens and closes a valve, moves an object back and forth as in a pump, or replaces a motor. This energy is released when the alloy changes its shape.

There are two major shape memory alloy systems, nickel-titanium, commonly referred to as Nitinol, and the copper-based SME brass composition. Among the practical uses for SME alloys, are connectors, valve actuators, vent openers, solar energy controls, automotive devices, and fire safety systems.

Other typical but not inclusive uses of the shape memory effect alloys has been to seal joints to prevent radiation leakage from pipes in nuclear power plants. Nitinol dental braces unlike the conventional stainless-steel braces which need constant and painful tightening, exert a steady even pressure. Swim suits and brassieres including the alloy spring back into their original shape when heated in a washing machine or dryer. Circuit breakers including the alloy reset themselves automatically when the alloy wires have cooled. Copper alloy coils have been developed which shut off the hot water in a shower when the water temperature reaches the scalding point. Eye glass frames that incorporate the alloy snap back into shape when dipped into a cup of hot water. Shape memory effect robot devices include a wire skeleton in the form of a four-legged insect with legs driven by SME wires. By phasing the electrical heating of each leg by microprocessor, the insect hops across a flat surface. The alloys exert as much as 60,000 pounds per square inch of pressure. Thus, an alloy spring about the size of a coffee cup will lift 300 pounds about a foot when the spring is heated.

2. Background Art

Metals are characterized by such physical qualities as tensile strength, ductility, malleability and conductivity. To these, in the case of a new family of alloys, one can add the anthropomorphic qualities of memory and trainablity. The alloys exhibit what is called the shape-memory effect as noted above. If such alloys are plastically deformed at one temperature, they completely recover their original shape on being raised to a higher temperature. In recovering their shape the alloys prodcue a displacement or a force, or a combination of the two, as a function of temperature. Because of these properties shape-memory alloys solve a variety of problems. In one application shape-memory alloys provide leakproof couplings for pneumatic and hydraulic lines. They also serve as tight seals and couplings in electronic assemblies. The alloys have been exploited in mechanical and electromechanical control systems to provide, for example, a precise mechanical response to small and repeated temperature changes.

In order for an alloy to exhibit the shape-memory effect it must have a crystal structure that shifts into the configuration known as martensite when subjected to a certain temperature or stress and then shift out of it. In a simple example a wire of shahpe-memory alloy is bent at room temperature into the form of a four-leaf clover. Then the wire is heated until its crystal structure assumes a high-temperature configuration called the beta or parent phase. Next the wire is rapidly cooled so that the atoms in the metal rearrange themselves into the crystal form of martensite. One can bend or twist the wire into any other form. If the wire is later heated to a temperature above that at which the martensite reverts to the parent phase, there is an orderly shift of large groups of atoms that restores the original cloverleaf form. Since the martensite transformation is essential for the shape-memory effect, alloys that exhibit memory are also known as marmem alloys.

One of the first uses of the marmem alloys was as a latching device for a British satellite in which a torsion tube of the alloy triggered the release of three instrument booms. The alloys have also been employed as couplings for hydraulic-fluid lines in the F-14 jet fighter. The transformation temperature of the Nitinol family of alloys can be manipulated over a remarkably wide range, from −273 to 100 degrees C., by altering the nickel-titanium ratio and by adding small amounts of other elements. For the hydraulic coupling an alloy with a transition temperature below −120 degrees C. was used. The coupling, in the form of a sleeve, is machined at ordinary temperature to have an inner diameter about 4 percent smaller than the outer diameter of the tubes it is to join. The coupling is then cooled to below the temperature at which martensite forms. While it is at this low temperature it is forcibly expanded to a diameter 4 percent greater than the tube diameter, for an overall internal strain of about 8 percent. Still at a cryogenic temperature to maintain the martensite phase, the coupling is fitted over the ends of the tubes that are to be joined. When it is warmed to room temperature, the couping is caused to shrink tightly around the ends of the tubes. The seal is made tighter by machining circular ribs into the inner surface of the coupling. Similar but larger couplings are being used for joining hydraulic and air lines on merchant ships.

There has also been developed an electrical connector that forms a high-compression fit yet can be quickly released and recoupled. Fabricated from a Nitinol alloy, the device is in the shape of a ring that closes the fingers on a pin connector. The connector is opened by chilling it with a blast of a cold fluorocarbon gas from an aerosol can and it closes when it warms up. The forces exerted by such shape-memory coupling devices are about 200 times greater than the force that would be exerted by the expansion and contraction of a bimetallic element of the same weight. Moreover, shape memory is effected at a predetermined temperature rather than over a broad range of temperatures, as would be the case for a device dependent on thermal expansion.

In a large joint such as the hip the artificial ball and socket are joined to the bone by a cement, with attendant problems of misalignment and even bone fracture. An alternative fastening method relies on Nitinol butterflies attached to the part of the artificial joint that is inserted into the central hollow of the bone. The butterflies are inserted cold and expand to form a tight lock on reaching body temperature.

Another orthopedic problem is the pulling together of the parts of a fractured bone to ensure their alignment and to encourage rapid calcification. The standard method of compressive fixation calls for pins, screws and plates, and it is also slow. With plates of Nitinol, which are installed chilled, body heat pulls the fractured parts of the bone into alignment.

Another application of the shape-memory effect is filtering blood clots out of the circulatory system before they do serious harm. Most clots of dangerous size form in the legs and lower trunk and travel through the veins to the heart and lungs, where they can block a vital blood vessel. Thus there has been developed a screen-like filter with a mesh size of about two millimeters from a continuous length of Nitinol wire. The wire is straightened out when it is cooled below the martensite-transformation temperature, chosen to be well below body temperature. As the wire is chilled to maintain its straightened condition, it is inserted through a catheter in an arm vein into the vena cava, the large vein that feeds into the heart. As the wire warms up it assumes the screen-like form.

In the pen-drive mechanism of recording and industrial-control instruments, the pen arm is actuated by a galvanometer, an electromechanical device that responds to the presence of an electric current. There has been devised a pen drive that exploits the shape-memory response of Nitinol wire. The wire, under tension restrainst lengthens and shortens in response to the amount of heat supplied by a small induction coil. The coil in turn is energized in response to the voltage input to the recorder from a transducer connected to whatever the recorder is measuring. The Nitinol wire exerts much larger forces than a galvanometer drive, so that the mechanism requires fewer bearings and pivots.

The parameter that determines the working temperature range of an SME device is composition. In the case of nickel-titanium alloys, the usual composition is in the region of 50–50 atomic percent of the two elements. Other additions to this system which have been employed to yield special properties include Sn, Mn, and Si.

A family of shape memory alloys has been developed based not on nickel and titanium but on copper, zinc and aluminum. These ternary alloys are less expensive than Nitinol and are much easier to machine and fabricate. Such ternary alloys consist of between 68 and 80 percent copper. The remaining 20 to 32 percent consists of zinc and aluminum in various proportions. In these ternary alloys, slight shifts in composition give rise to large changes in the martensite transformation, from values as low as −105 degrees C. to as high as 299 degrees. For alloys that are readily fabricated, however, the range is narrower: roughly from −100 degrees to 100 degrees. For a given alloy the shape-memory effect extends over a range of about 80 degrees. At higher temperatures there is a tendency for the martensite to become unstable, so that the usual upper temperature for operation is 150 degrees. Some of the uses for Nitinol apply to copper-based ternary alloys including couplings, springs and actuators.

There has been developed a series of devices in which the shape-memory alloy serves as both a temperature sensor and an actuator. One such device is a thermostatic valve for individual radiators in a home or office heating system. The temperature at which the valve opens is set by turning a knob that alters the compression on a spring acting against a spring made of the memory alloy. The characteristic of the memory spring is such that the force it exerts increases as its temperature rises. In crystallographic terms, as the temperature increases an increasing fraction of the martensite is transformed into the parent phase, which is associated with a memory of the spring in its expanded position.

A similar memory spring has been used to regulate the clutch system that coupled and uncouples the radiator fan in an automobile cooling system. Present devices operate through a viscous-fluid clutch controlled by a bimetallic spring. The memory-alloy clutch eliminates the need for fluid seals and provides a more flexible speed control. Shape-memory systems are able to replace small electric motors, solenoid-actuated valves and various engine-control devices. One device is a variable-throat or variable-jet carburetor to provide optimum fuel economy over a range of air and fuel temperatures.

SME alloys have also been used to recover energy from waste heat or low-temperature water by converting heat into mechanical energy. A shape-memory engine has been developed for generating useful amounts of energy and is operated with wire loops of Nitinol that move up and down on spokes attached by a bell crank to a wheel. As the wheel turns, the loops dip first into cold water and then into hot water, causing the loops to open and close. The device resembles a multipiston radial engine. In another arrangement strips of a ternary memory alloy open and close like an accordion as they are heated and cooled, giving rise to an axial motion that can be converted into a rotary motion by a crank.

One of the latest engines makes use of the walking-beam principle. The piston consists of 88 lengths of Nitinol wire about 15 inches long. As the wire drive is alternately submerged in hot and in cold water the contraction and expansion of the wire is transmitted through the walking beam and transverse links to an output wheel. A secondary crank arm controls the dwell time in the two water baths, much as a variable linkage controls the valve action in a steam engine.

A window opener for a greenhouse has been developed that is actuated by a coil spring fabricated out of a copper rich SME alloy. At temperatures below about 18 degrees C. (65 degrees F.) the spring is fully contracted and the window remains closed. When the temperature rises about 18 degrees the SME alloy spring overcomes the force of a bias spring and begins to open the window. At 25 degrees the alloy spring is fully extended.

Without exhausting the existing uses of the shape-memory effect alloys there may be mentioned their use to seal joints in submarines; in coffee makers; as an artificial tooth; to attach logic chip packages to circuit boards; and robotic hands that flex and close when an electrical current is transmitted through SME alloy tendons.

The alloys have replaced in some instances motors, solenoids, and bimetallic actuators, as electrical actuators in which the alloy is rapidly heated with current. For example, an SME alloy actuator opens and closes fog lamp shutters, and operates a remote control trunk release for cars. Thermal actuators driven by changes in the environmental temperature employ the alloy to operate air conditioning louvers and fire sprinkler heads.

Several U.S. Patents are more or less pertinent to the general area of technology involved herein although they do not teach the inventive concept. For example U.S. Pat. No. 4,596,483 teaches a flat plate of memory alloy having a slit perpendicular to the plane of the plate which, upon heating deforms, allowing the material on each side of the slit to deflect out of the plane of the plate in opposite directions, thus releasing any object clamped or retained by the plate. It teaches no means for returning to its original configuration upon again cooling.

U.S. Pat. No. 4,529,172 teaches a clamp or retainer for holding a cable in a fixed relationship to a hauling line. The clamp is a bimetal which is activated by application of heat. This device also does not reverse the actuation upon completing the temperature cycle.

U.S. Pat. No. 3,783,429 teaches a temperature actuated device wherein a first member and a second member are attached in opposition so as to tend to work against each other, with the force of the first member dominating at a first temperature, fixing the device in a first position, and the force of the second member dominating at a second temperature so as to cause movement of the device to a second position. Actuation of the device is dependent on the relative strengths of the two materials at the different temperatures.

U.S. Pat. No. 4,022,519 teaches the use of a shape memory material to form one part of an electrical connector which locks at an operating temperature but releases at a particular second temperature.

None of the references teach the use of an intermediate position of shape memory metal to apply a working load with a complete cycling of the load upon completing a required temperature cycle.

SUMMARY OF THE INVENTION

In the phenomenon known as the shape memory effect, in essence, a part deformed or stretched at one temperature will, upon being heated to a second temperature, completely recover its original shape. Through appropriate heat treatment, the part can be made to spontaneously change from one shape to the other when cycled between two temperatures. In the process, the moving metal delivers substantial force.

Shape memory is a behaviour unique to alloys which undergo what is referred to as a martensitic transformation. This is the transformation in crystal structure which occurs in the heat treating of steels to give them hardness and strength. In shape memory, the martensite, unlike the martensite in steel, is thermoelastic; that is, it continually appears and disappears with falling and rising temperatures.

A specimen in the martensitic condition may be deformed in what appears to be a plastic manner, but is actually deforming as a result of a growth and shrinkage of individual martensitic plates. When the specimen which has been deformed is heated to the temperature where the martensite structure changes to the stable elevated temperature crystal structure, a complete recovery of the deformation takes place. Though the specimen must be heated to a relatively high temperature and then quenched to form the intial martensite structures, the metal can revert to the parent structure with only moderate heating. A typical transformation temperature range for copper base memory alloys is 20° C.

Two manifestations of memory can be observed, a one-way memory effect and a two-way memory. In the former, a part which has been heat treated to yield the martensite structure may be deformed up to the strain limit. This new shape is retained until the part is heated to the temperature at which martensite transforms to the elevated temperature stable structure. When this occurs, the alloy reverts back to the originally formed shape. Further heating or cooling does not produce any further change.

Producing a part with two-way memory requires a special heat treatment procedure. The component is formed to its initial shape, then heated and quenched to produce martensite. The component is then deformed to its second shape and then cycled between the lower temperture where martensite is stable to the temperature where the parent crystal structure is stable, usually a matter of 30 or 40° C. At the same time that the part is thermally cycled, it is subjected to a forced deflection or strain. After many such thermomechanical cycles the part will spontaneously assume one shape at the elevated temperature and its second shape at the lower temperature.

The present invention relates to a pre-tensioned shape memory actuator for providing remote actuation at relative high loads, and is particularly applicable to space station clamping mechanisms which may be idle for long periods of time. The actuator utilizes a two-way shape memory alloy which is pre-tensioned to allow the actuator unit to foreshorten when heated and to re-expand to apply a load so as to place the memory alloy element in compression when cooled. The alloy is mounted on a clamping device so as to provide loading of the clamp when the alloy is cooled.

The pre-tensioned shape memory actuator may be employed wherever a simple means of remote actuation at relatively high loads and low strokes is required. For example, one application is for surfaces requiring high clamping pressures to achieve a large thermal contact conductance, such as the evaporator of a space radiator and the corresponding heat transport loop condenser. The actuator in this instance combines the functions of providing stroke and force. A previous means of accomplishing this task has been a thermal expansion bolt which opens to provide clearance by means of heating it to an elevated temperature, and so producing an elongation due to the coefficient of thermal expansion. Another alternative would be to use an electric motor with a jackscrew and gear train to activate the clamping mechanism.

The pre-tensioned shape memory actuator, however, has the advantage of simplicity and reliability over a jackscrew arrangement, since the only moving part is the shape memory tube, which is actuated by heat. Electrically applied heat is a reliable means of heat application. This is quite significant for use in space station clamping mechanisms, as these systems may be idle for long periods of time on the order of several years and then be called upon to activate. Electric motors, however would be subject to seizing under such conditions.

The pre-tensioned shape memory actuator also has the advantage of being able to develop a much longer stroke than a comparable thermal expansion bolt, and at a much lower actuation temperature.

The pre-tensioned shape memory actuator utilizes a two-way shape memory alloy which is pre-tensioned in order to allow the unit to shorten when heated and re-expand to apply a load, which places the element in compression, when it is cooled. This has advantages over one-way shape memory actuators which require a separate spring element to re-tension them after each use and apply the clamping load. The pre-tensioned unit has advantages over a non pretensioned two way unit which is unable to shrink on heating in situations where the applied load is compressive.

The present invention also relates to a shape memory actuator capable of reliable functioning after long periods of inactivity for providing remote actuation at relatively high loads to space station clamping mechanism comprising a two-way shape memory alloy formed into an actuator having an original position, said alloy being pre-tensioned to a pre-tensioned position, means for partially compressing said alloy actuator to a position intermediate said original position and said pre-tensioned position whereby said alloy actuator fore-shortens back to its original position when heated and expands back to the intermediate position when heated and expands back to the intermediate position when cooled.

The invention further relates to the method of applying a compressive force to a work object comprising the steps of utilizing as part of a clamping device a two-way shape memory alloy actuator, pre-tensioning said alloy actuator to a pre-tensioned position, partially compressing said actuator to a position intermediate its original position and said pre-tensioned position, heating said actuator and allowing said actuator to fore-shorten back to its original position, cooling said actuator to cause it to expand again to its intermediate position, arranging said actuator in the clamping device in order to apply compressive forces to the work objects under normal temperatures, heating the actuator to release the compressive forces, and cooling the actuator to again apply the compressive forces to the work object.

Still further, the invention relates to a clamping device comprising a shape memory actuator capable of reliable functioning after long periods of inactivity for providing remote actuation at relatively high loads to space station mechanisms, a two-way shape memory alloy formed into said actuator and having an original position, said alloy being pre-tensioned to a pre-tensioned position, means for partially compressing said alloy actuator to a position intermediate said original position and said pre-tensioned position whereby said alloy actuator fore-shortens back to its original position when heated and expands back to the intermediate position when cooled, means for applying force to work object, said actuator being in contact with the applying means whereby said actuator supplies the force to said applying means at its intermediate position under normal temperatures and releases the force to said applying means when heated, the force being supplied again when said actuator is cooled and reverts to its intermediate position.

In addition, the invention relates to the method of making a two-way shape memory alloy article comprising the steps of fabricating the article from a shape memory alloy having a predetermined initial length $l_o$, stretching the article to a length $l_s$ greater than its initial length $l_o$, compressing the article to a length $l_c$, heating the article until its length returns to the initial length $l_o$, and cooling the article until its length expands to the compressed length $l_c$.

For the purposes of the present invention, the preferred alloys for use herein are identified as follows:

| Alloy Designation | CZA | NT |
|---|---|---|
| Alloy Composition | CuZnAl | NiTi |
| Transition Temperature Range ($T_z$) | −200° C. to 80° C. | −200° C. to 100° C. |
| Service Temperature Range | −200° C. to 100° C. | −200° C. to 300° C. |
| Beta Mechanicals | | |
| Yield Strength (psi × 10³) | 40 | 60 to 80 |
| Young's Modulus (psi × 10⁶) | 15 | 10 to 15 |
| Tangent Modulus (psi × 10⁶) | 3.0 | — |
| Martensite Mechanicals | | |
| Yield Strength (psi × 10³) | 15 to 30 | 10 to 15 |
| Young's Modulus (psi × 10⁶) | 10 | 5 |
| Tangent Modulus (psi × 10⁶) | 0.06 | — |
| Recoverable Strain - One Time Device | | |
| Tension (%) | 2 | 4 |
| Shear (%) | 4 | 8 |
| Cyclic Device | | |
| Tension (%) | 1 | 2 |
| Shear (%) | 2 | 4 |
| Density (lb/in³) | 0.29 | 0.23 |
| Electrical Resistivity (ohm − in × 10⁻⁶) | 3 | 30 |
| Thermal conductivity (BTU/ft − hr − °F.) | 60 | 10 |

Other advantages of this invention will be apparent from the descriptions which follow, in conjunction with the accompanying drawings an claims.

DETAILED DESCRIPTION OF THE PREFERRED EMBODIMENT

As noted hereinabove, a two-way shape memory alloy is a material processed to repeat, on the second and the subsequent cycle, the first cycle's strain recovery memory witout an intervening step. This intervening step is required of one-way materials and is manifested by a separate force inducing element, usually a stored energy spring, that resets or restretches the material in order for it to regain its memory after the first cycle. In two-way alloys the separate force inducing element is not required and hence makes for a simpler and lighter arrangement. In the present invention, application of heat foreshortens the memory element and relieves the heat exchanger clamp force. When heat is removed, the memory element increases in length and produces 32,000 lbs clamping force required for thermal conductivity.

Figure 1:
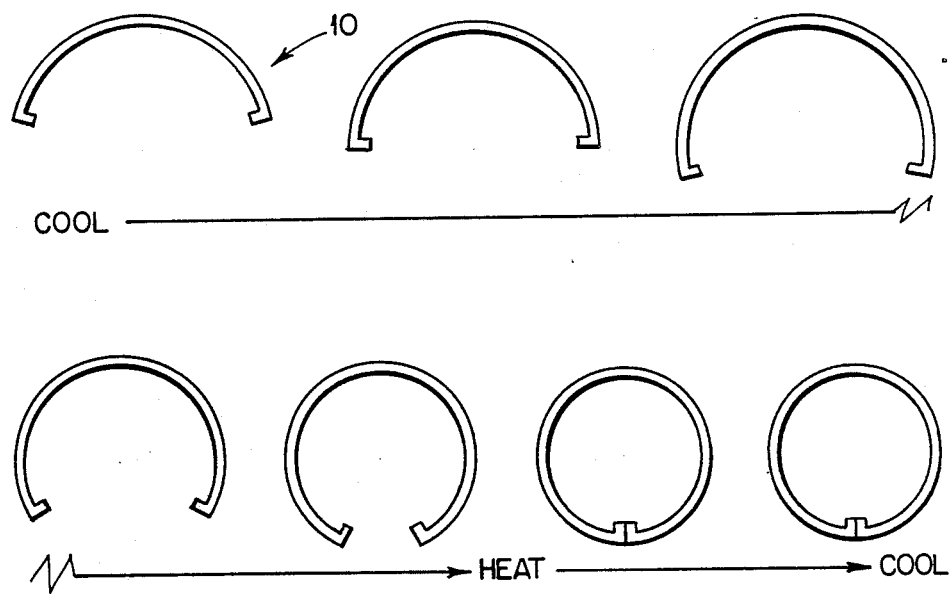
FIG. 1 is a representation of the one-way memory effect of an SME alloy imprinted with one-way memory.

For example, in FIG. 1, there will be seen a representation of the one-way memory effect wherein an SME alloy strip 10 imprinted with one-way memory is shown on heating over a typical temperature change of 10° C. to 20° C.

Figure 2:
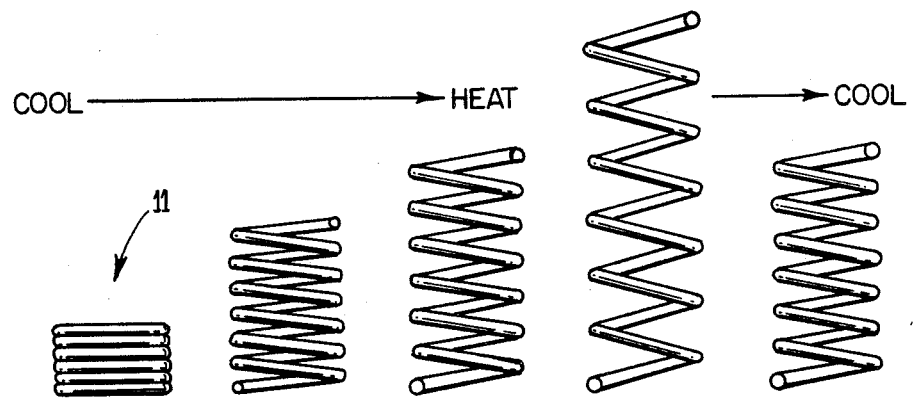
FIG. 2 is a representation similar to FIG. 1 but showing the two-way memory effect of an SME alloy imprinted with two-way memory.

FIG. 2 on the other hand, illustrates the two-way memory effect and there will be seen an SME alloy spring 11 imprinted with two-way memory on heating and cooling over a typical temperature change of 20° C. to 30° C.

In FIG. 1, the process is not reversible. In other words, the closed ring strip 10 in the cold zone will not revert to its original open shape by change in temperature. However, the spring 11 in FIG. 2 will alternately lengthen and shorten in response to temperature.

Figure 3:
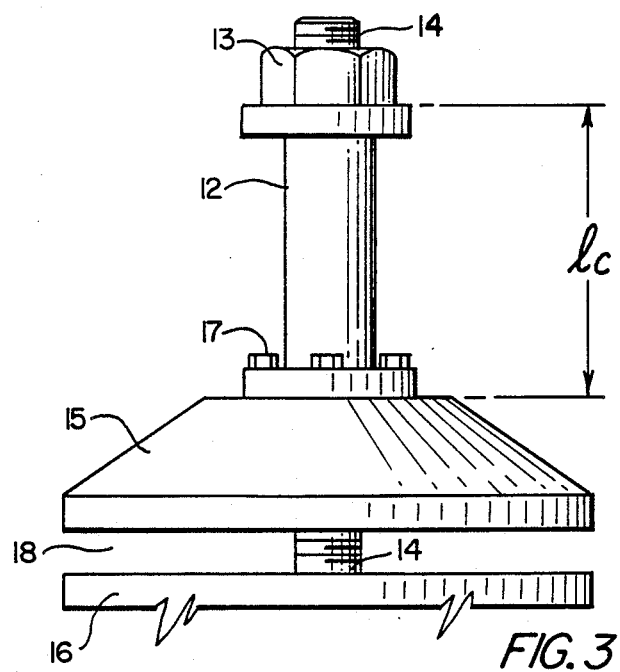
FIGS. 3 and 4 are pictorial representations of a first embodiment of the invention and showing a clamping device embodying the shape memory actuator.
Figure 4:
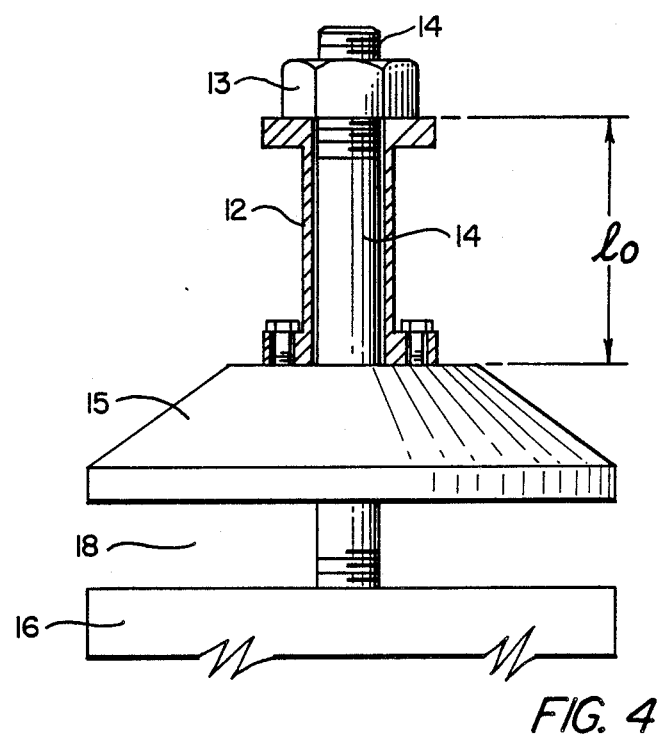

As shown in FIGS. 3-4 a pre-tensioned shape memory actuator 12 is used to apply and relieve a clamping force between upper 15 and lower 16 pressure platens. For use with a space radiator evaporator and heat transport loop condenser, this force would be on the order of about 32,000 lbs. The items to be clamped are located within the gap 18 between the two pressure platens 15 and 16. The platens can be atttached to a honeycomb load distribution member, a whiffletree load distribution structure, or other load distribution device. The actuator 12 is fixed to the pressure platen 15 using bolts 17, and is also affixed to the upper nut 13 and thus to the central threaded tension stud 14.

Figure 5:
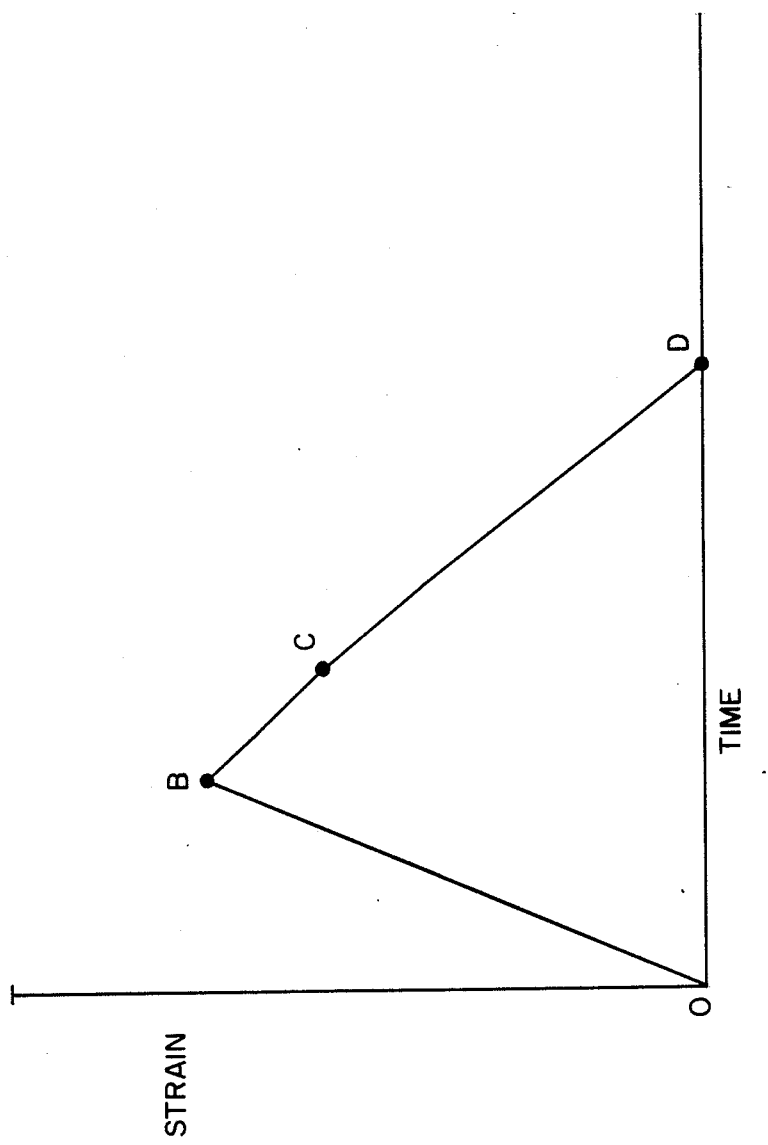
FIG. 5 is a strain-time curve illustrating the principle of operation of the present invention.

The principle of operation is illustrated by referring to the strain-time curve in FIG. 5. The actuator 12 is fabricated from a two-way shape memory alloy. Its initial length is $l_o$. This is time O on the strain-time curve. The actuator 12 is stretched to a length $l_s$ which is greater than $l_c$ in FIG. 3. This is the highest strain point B on the strain-time curve, and represents the effects of pre-tensioning. The actuator 12 is placed over the stud 14 and the nut 13 is tightened, producing the clamping load and compressing the actuator 12 to length $l_c$. This is point C on the strain-time curve. The strain in the actuator 12 is still tensile. When it is desired to open the platens 15, 16, the actuator 12 is heated (line C-D) and the tensile strain is recovered, with the length returning to $l_o$ (point D). Upon cooling, the length of the actuator 12 expands to $l_c$, reapplying the clamping force. Line OB in FIG. 5 is the initial tensioning of the fabricated actuator 12.

The device in FIGS. 3-4 has utility in a wide variety of applications. For example, it is useful to apply an actuating load and stroke for clamping a radiator element evaporator to a thermal bus condenser, as well as other space station and platform thermal contact interfaces. It is especially useful in all operations that require forces at relatively low stroke particularly following long periods of inaction and with high reliability. Since the alloy is pre-tensioned to allow tensile strain recovery despite the carrying of a compressive load, the device is useful where there is required shrinkage and tensile strain recovery in the actuated state while there is a normal carrying of a compressive load. It should be noted, that when the device of FIGS. 3-4 is used as a clamp, a change in temperture can be used to cause the clamp to disassemble and re-assemble. Thus, its field of utility can be extended, for example, to arrangements requiring automatic release of clamping forces or remote control of the applied load and stroke. Furthermore, when used for clamping a radiator element evaporator to a thermal bus condenser, it has the advantage relative to a quick disconnect device of not requiring the opening of any fluid lines.

While many SME alloys exist, the two particular alloys found to be most useful in the present invention are set forth in Table 1 following. In Table 1, the $T_z$ transition temperature is the temperature at which SME alloys begin shape memory recovery upon heating.

TABLE 1

| NOMINAL MEMRYTEC ALLOY PHYSICAL PROPERTIES | | |
|---|---|---|
| Alloy Designation | CZA | NT |
| Alloy Composition | CuZnAl | NiTi |
| Transition Temperature Range ($T_z$) | −200° C. to 80° C. | −200° C. to 100° C. |
| Service Temperature Range | −200° C. to 100° C. | −200° C. to 300° C. |
| Beta Mechanicals | | |
| Yield Strength (psi × $10^3$) | 40 | 60 to 80 |
| Young's Modulus (psi × $10^6$) | 15 | 10 to 15 |
| Tangent Modulus (psi × $10^6$) | 3.0 | — |
| Martensite Mechanicals | | |
| Yield Strength (psi × $10^3$) | 15 to 30 | 10 to 15 |
| Young's Modulus (psi × $10^6$) | 10 | 5 |
| Tangent Modulus (psi × $10^6$) | 0.06 | — |
| Recoverable Strain- One Time Device | | |
| Tension (%) | 2 | 4 |
| Shear (%) | 4 | 8 |
| Cyclic Device | | |
| Tension (%) | 1 | 2 |
| Shear (%) | 2 | 4 |
| Density (lb/$in^3$) | 0.29 | 0.23 |
| Electrical Resistivity (ohm − in × $10^{-6}$) | 3 | 30 |
| Thermal conductivity (BTU/ft − hr − °F.) | 60 | 10 |

The particular alloys set forth in the foregoing Table 1 are products of Memory Metals, Inc., Stamford, Connecticut.

With reference to FIGS. 3–4, it should be noted that as with all SME alloy uses, there must be control also for the ambient temperature seen by the actuator in the passive state in order to prevent accidental actuation.

The shape memory response is one of strain recovery essentially. Therefore in order for the memory element 12 in FIG. 4 to contract and thereby relieve the clamping load of FIG. 3, element 12 must be initially tensioned so that the tensile strain can be recovered by heating. While this procedure of pre-tensioning means a reduction in the effective stroke by the amount of the compression, the net effect is of little significance.

With respect to the use of the concept in space applications, it should be noted that in addition to the radiator thermal interface, contact/clamp devices are required for the bus/module heat exchangers, upper and lower boom loads, and between the payload carriers and co-orbiting platform. It is also possible to adapt shape memory actuation to the heat pipe disconnect. Shape memory devices are advantageous for most thermal control system actuators requiring reliable functioning after long periods of inactivity.

In FIG. 3, the SME alloy tube actuator 12 is loaded in compression and passes a 32,000 pound load from nut 13 to upper pressure platen 15, thus tensioning bolt 14.

Therefore, the items which it is desired to clamp, which are located in the gap 18 between the platens 15 and 16, are subjected to the 32,000 pound clamping force. Actuator 12 is fixed to upper platen 15 by retaining bolts 17. To open the device, in FIG. 4 the actuator tube 12 is heated and contracts thereby recovering the pre-applied tensile strain less compressive deflection. This lifts upper pressure platen 15 to increase gap 18 and relieve the load. The upper end of the actuator tube 12 is fixedly attached to either nut 13 or bolt 14 by welding, for example.

Figure 6:
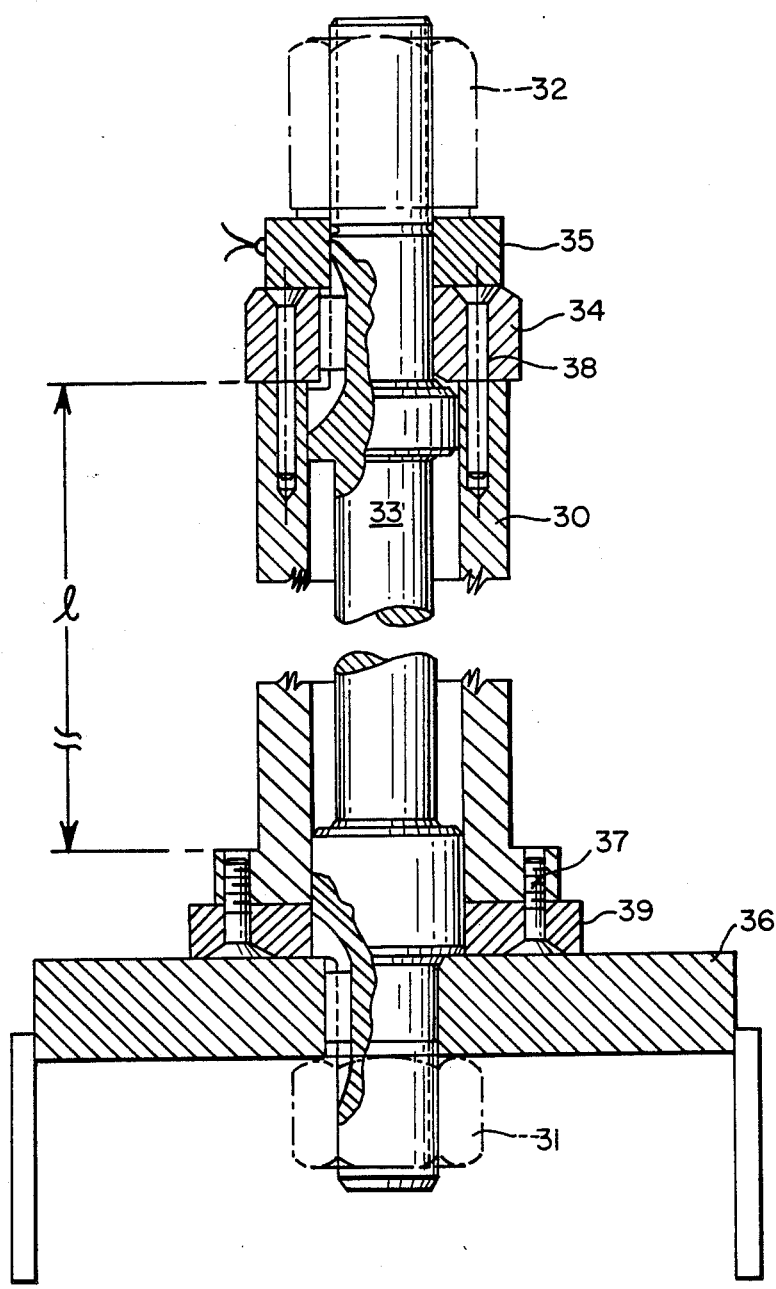
FIG. 6 is a pictorial representation similar to FIGS. 3-4 but showing a second embodiment thereof.

A second embodiment of a clamping device is shown in FIG. 6 and will be seen to include SME alloy tube actuator 30 within which passes tension rod 33 having nuts 31 and 32 at its respective ends. An upper pressure platen 34 or workpiece is attached to the upper end of actuator 30 with fasteners 38. Above pressure platen 34 is a load cell 35 which is wired to a transducer (not shown) for indicating the magnitude of force exerted by actuator 30. A lower pressure platen 39 is attached to the lower end of actuator 30 with fasteners 37. The assembly is carried on a support stand 36. Both lower pressure platen 39 and support stand 36 are shown as simple designs aimed at facilitating test and demonstration of the load exerted by actuator 30. A 0.5 inch stroke differential is generated between lower pressure platen 39 and support stand 36. Said stroke represents sufficient clearance to insert, for example, a radiator panel in the space station application.

The system of FIG. 6 is ideal for the heat-exchanger clamp mechanism in the active thermal control system of the space station. Details of the duty cycle are shown in Table 2.

TABLE 2

| Temperature °F. | P lbs. | L in. |
|---|---|---|
| 75 | 32,000 | 24 |
| Elevated | 0 | 23.5 |
| 75 | 32,000 | 24 |

The preferred alloy for the actuator 30 of FIG. 6 is the ternary Cu-Zn-Al material of Table 1. A washer type load cell and an ALD transducer readout are suitable and preferred instrumentation.

While embodiments of the invention have been described, variations thereof can be made without departing from the teachings of the invention. Therefore, it is intended that the scope of the invention be limited only be the claims which follow.

I claim:

1. A shape memory actuator capable of reliable functioning after long periods of inactivity for providing remote actuation at-relatively high loads to clamping mecahnisms comprising a two-way shape memory alloy formed into an actuator having an original position, said alloy being pre-tensioned to a pre-tensioned position, means for partially compressing said alloy actuator to a position intermediate said original position and said pre-tensioned position whereby said alloy actuator foreshortens back to its original position when heated and expands back to the intermediate position when cooled.

2. An actuator in accordance with claim 1 wherein the alloy is selected from the group consisting of CuZnAl and NiTi.

3. An actuator in accordance with claim 2 wherein the alloy possesses the following properties:

| | |
|---|---|
| Transition Temperature Range (T$_z$) | −200° C. to 80° C. |
| Service Temperature Range | −200° C. to 100° C. |
| Beta Mechanicals | |
| Yield Strength (psi × 10$^3$) | 40 |
| Young's Modulus (psi × 10$^6$) | 15 |
| Tangent Modulus (psi × 10$^6$) | 3.0 |
| Martensite Mechanicals | |
| Yield Strength (psi × 10$^3$) | 15 to 30 |
| Young's Modulus (psi × 10$^6$) | 10 |
| Tangent Modulus (psi × 10$^6$) | 0.06 |
| Recoverable Strain - | |
| One Time Device | |
| Tension (%) | 2 |
| Shear (%) | 4 |
| Cyclic Device | |
| Tension (%) | 1 |
| Shear (%) | 2 |
| Density (lb/in$^3$) | 0.29 |
| Electrical Resistivity (ohm - in × 10$^{-6}$) | 3 |
| Thermal conductivity (BTU/ ft- hr-F.°) | 60 |

4. An actuator in accordance with claim 2 wherein the alloy possesses the following properties:

| | |
|---|---|
| Transition Temperature Range (T$_z$) | −200° C. to 100° C. |
| Service Temperature Range | −200° C. to 300° C. |
| Beta Mechanicals | |
| Yield Strength (psi × 10$^3$) | 60 to 80 |
| Young's Modulus (psi × 10$^6$) | 10 to 15 |
| Tangent Modulus (psi × 10$^6$) | — |
| Martensite Mechanicals | |
| Yield Strength (psi × 10$^3$) | 10 to 15 |
| Young's Modulus (psi × 10$^6$) | 5 |
| Tangent Modulus (psi × 10$^6$) | — |
| Recoverable Strain - | |
| One Time Device | |
| Tension (%) | 4 |
| Shear (%) | 8 |
| Cyclic Device | |
| Tension (%) | 2 |
| Shear (%) | 4 |
| Density (lb/in$^3$) | 0.23 |
| Electrical Resistivity (ohm - in × 10$^{-6}$) | 30 |
| Thermal conductivity (BTU/ ft- hr-F.°) | 10 |

5. A clamping device comprising a shape memory actuator capable of reliable functioning after long periods of inactivity for providing remote actuation at relatively high loads to mechanisms, a two-way shape memory alloy formed into said actuator and having an original position, said alloy being pre-tensioned to a pre-tensioned position, means for partially compressing said alloy actuator to a position intermediate said original position and said pre-tensioned position whereby said alloy actuator fore-shortens back to its original position when heated and expands back to the intermediate position when cooled, means for applying force to a work object, said actuator being in contact with the applying means whereby said actuator supplies the force to said applying means at its intermediate position under normal temperatures and releases the force to said applying means when heated, the force being supplied again when said actuator is cooled and reverts to its intermediate position.

6. A clamping device in accordance with claim 5 wherein the alloy is selected from the group consisting of CuZnAl and NiTi.

7. A clamping device in accordance with claim 6 wherein the alloy possesses the following properties:

| | |
|---|---|
| Transition Temperature Range (T$_z$) | −200° C. to 80° C. |
| Service Temperature Range | −200° C. to 100° C. |
| Beta Mechanicals | |
| Yield Strength (psi × 10$^3$) | 40 |
| Young's Modulus (psi × 10$^6$) | 15 |
| Tangent Modulus (psi × 10$^6$) | 3.0 |
| Martensite Mechanicals | |
| Yield Strength (psi × 10$^3$) | 15 to 30 |
| Young's Modulus (psi × 10$^6$) | 10 |
| Tangent Modulus (psi × 10$^6$) | 0.06 |
| Recoverable Strain - | |
| One Time Device | |
| Tension (%) | 2 |
| Shear (%) | 4 |
| Cyclic Device | |
| Tension (%) | 1 |
| Shear (%) | 2 |
| Density (lb/in$^3$) | 0.29 |
| Electrical Resistivity (ohm - in × 10$^{-6}$) | 3 |
| Thermal conductivity (BTU/ ft- hr-F.°) | 60 |

8. A clamping device in accordance with claim 6 wherein the alloy possesses the following properties:

| | |
|---|---|
| Transition Temperature Range (T$_z$) | −200° C. to 100° C. |
| Service Temperature Range | −200° C. to 300° C. |
| Beta Mechanicals | |
| Yield Strength (psi × 10$^3$) | 60 to 80 |
| Young's Modulus (psi × 10$^6$) | 10 to 15 |
| Tangent Modulus (psi × 10$^6$) | — |
| Martensite Mechanicals | |
| Yield Strength (psi × 10$^3$) | 10 to 15 |
| Young's Modulus (psi × 10$^6$) | 5 |
| Tangent Modulus (psi × 10$^6$) | — |
| Recoverable Strain - | |
| One Time Device | |
| Tension (%) | 4 |
| Shear (%) | 8 |
| Cyclic Device | |
| Tension (%) | 2 |
| Shear (%) | 4 |
| Density (lb/in$^3$) | 0.23 |
| Electrical Resistivity (ohm - in × 10$^{-6}$) | 30 |
| Thermal conductivity (BTU/ ft- hr-F.°) | 10 |

9. A clamping device in accordance with claim 5 wherein the force applying means constitutes a pair of spaced apart platens, said actuator being in contact with at least one of said platens.

10. The method of making a two-way shape memory alloy article comprising the steps of fabricating the article from a shape memory alloy having a predetermined initial length $l_o$, stretching the article to a length $l_s$ greater than its initial length $l_o$, compressing the article to a length $l_c$, heating the article until its length returns to the initial length $l_o$, and cooling the article until its length expands to the compressed length $l_c$.

11. The method of applying a compressive force to a work object comprising the steps of utilizing as part of a clamping device a two-way shape memory alloy actuator, pre-tensioning said alloy actuator to a pre-tensioned position, partially compressing said actuator to a position intermediate its original position and said pre-tensioned position, heating said actuator and allowing said actuator to fore-shorten back to its original position, cooling said actuator to cause it to expand again to its intermediate position, arranging said actuator in the clamping device in order to apply compressive forces to the work object under normal temperatures, heating the actuator to release the compressive forces, and cooling the actuator to again apply the compressive forces to the work object.

12. The method of treating an alloy in order to impart to its pretensioned properties comprising the steps of fabricating an article from a shape memory alloy having a predetermined initial length $l_o$, stretching the article to a length $l_s$ greater than its initial length $l_o$, compressing the article to a length $l_c$, heating the article until its length returns to the initial length $l_o$, and cooling the article until its length expands to the compressed length $l_c$.

13. A method as in one of the claims 10–12 wherein the alloy is in the shape of a tube.

14. A method as in one of the claims 10–12 wherein the alloy is selected from the group consisting of CuZnAl and NiTi.

15. A method as in one of the claim 10–12 wherein the alloy possesses the following properties:

| | |
|---|---|
| Transition Temperature Range ($T_z$) | −200° C. to 80° C. |
| Service Temperature Range | −200° C. to 100° C. |
| Beta Mechanicals | |
| Yield Strength (psi × $10^3$) | 40 |
| Young's Modulus (psi × $10^6$) | 15 |
| Tangent Modulus (psi × $10^6$) | 3.0 |
| Martensite Mechanicals | |
| Yield Strength (psi × $10^3$) | 15 to 30 |
| Young's Modulus (psi × $10^6$) | 10 |
| Tangent Modulus (psi × $10^6$) | 0.06 |
| Recoverable Strain - | |
| One Time Device | |
| Tension (%) | 2 |
| Shear (%) | 4 |
| Cyclic Device | |
| Tension (%) | 1 |
| Shear (%) | 2 |
| Density (lb/in$^3$) | 0.29 |
| Electrical Resistivity (ohm - in × $10^{-6}$) | 3 |
| Thermal conductivity (BTU/ ft-hr-F.°) | 60 |

16. A method as in one of the claims 10–12 wherein the alloy possesses the following properties:

| | |
|---|---|
| Transition Temperature Range ($T_z$) | −200° C. to 100° C. |
| Service Temperature Range | −200° C. to 300° C. |
| Beta Mechanicals | |
| Yield Strength (psi × $10^3$) | 60 to 80 |
| Young's Modulus (psi × $10^6$) | 10 to 15 |
| Tangent Modulus (psi × $10^6$) | — |
| Martensite Mechanicals | |
| Yield Strength (psi × $10^3$) | 10 to 15 |
| Young's Modulus (psi × $10^6$) | 5 |
| Tangent Modulus (psi × $10^6$) | — |
| Recoverable Strain - | |
| One Time Device | |
| Tension (%) | 4 |
| Shear (%) | 8 |
| Cyclic Device | |
| Tension (%) | 2 |
| Shear (%) | 4 |
| Density (lb/in$^3$) | 0.23 |
| Electrical Resistivity (ohm - in × $10^{-6}$) | 30 |
| Thermal conductivity (BTU/ ft- hr-F.°) | 10 |

* * * * *

UNITED STATES PATENT AND TRADEMARK OFFICE
CERTIFICATE OF CORRECTION

PATENT NO. : 4,899,543
DATED : February 13, 1990
INVENTOR(S) : Romanelli, et al.

It is certified that error appears in the above-identified patent and that said Letters Patent is hereby corrected as shown below:

Column 1, bridging lines 27 and 28, change "compostion" to

--composition--.

Column 1, line 60, change "readed" to --reached--.

Column 1, line 61, change "steeel" to --steel--.

Column 2, line 20, change "considerble" to --considerable--.

Column 2, line 63, change "trainablity" to --trainability--.

Column 2, bridging lines 67 and 68, change "prodcue" to

--produce--.

Column 3, line 14, change "shahpe-memory" to --shape-memory--.

Column 4, line 39, change "restrainst" to --restraint--.

Column 5, line 18, change "coupled" to --couples--.

Column 5, line 56, change "about" to --above--.

Column 7, line 1, change "intial" to --initial--.

Column 7, line 21, change "temperture" to --temperature--.

UNITED STATES PATENT AND TRADEMARK OFFICE
CERTIFICATE OF CORRECTION

PATENT NO. : 4,899,543
DATED : February 13, 1990
INVENTOR(S) : Romanelli, et al.

It is certified that error appears in the above-identified patent and that said Letters Patent is hereby corrected as shown below:

Column 8, line 17, change "mechanism" to --mechanisms--.

Column 8, line 25, delete "heated".

Column 8, line 26, delete in its entirety.

Column 8, line 55, after "to" insert --a--.

Column 9, line 37, change "an claims" to --and claims--.

Column 9, line 59, change "witout" to --without--.

Column 10, line 65, change "temperture" to --temperature--.

Column 12, line 51, change "be the" to --by the--.

Column 12, line 56, change "mecahnisms" to --mechanisms--.

Signed and Sealed this

Eleventh Day of December, 1990

*Attest:*

HARRY F. MANBECK, JR.

*Attesting Officer*  *Commissioner of Patents and Trademarks*